2,582,397

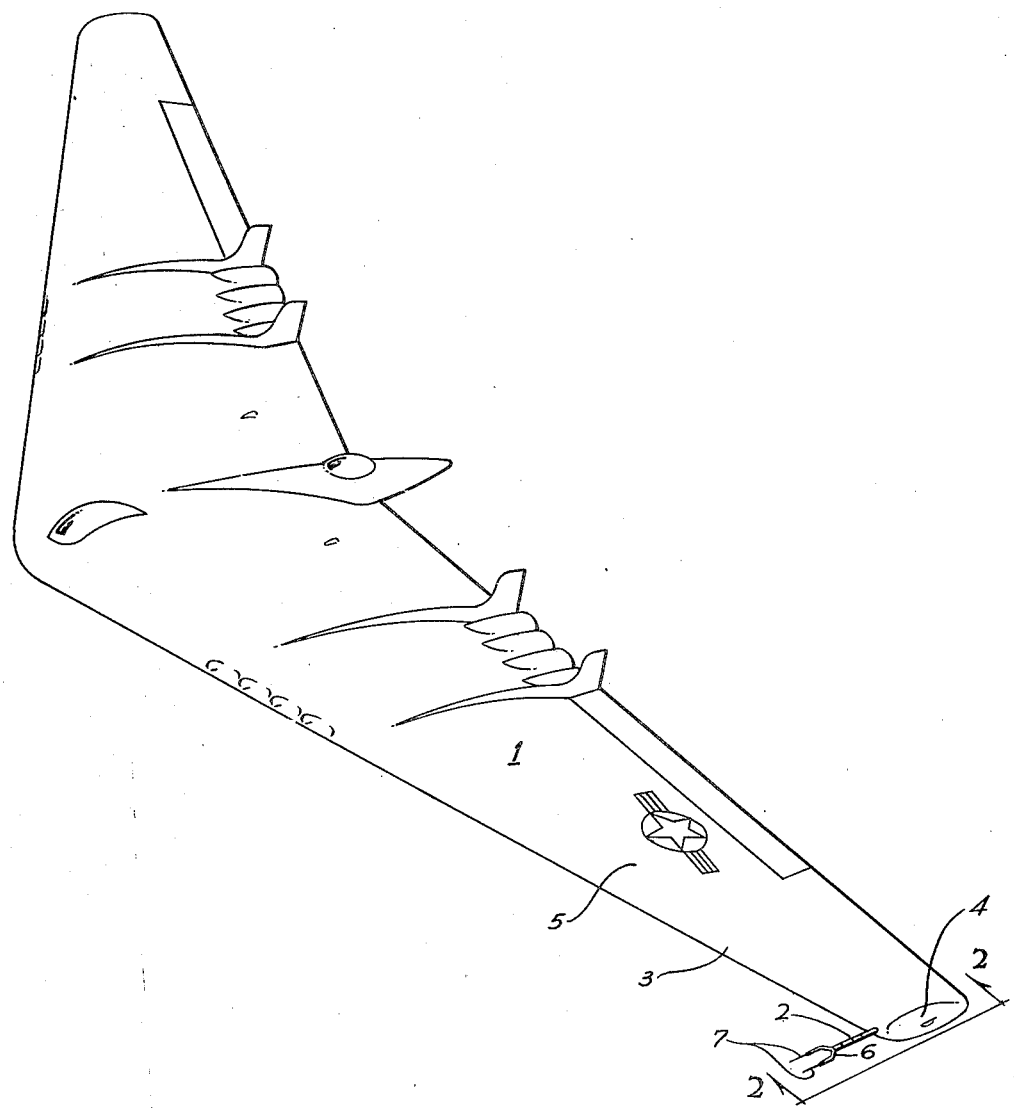

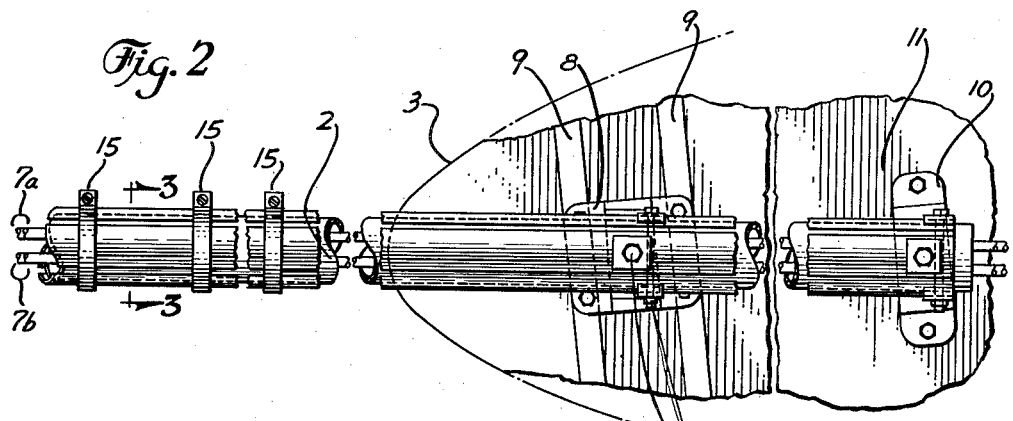
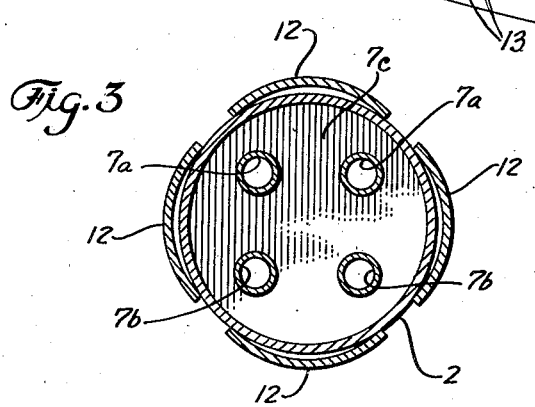
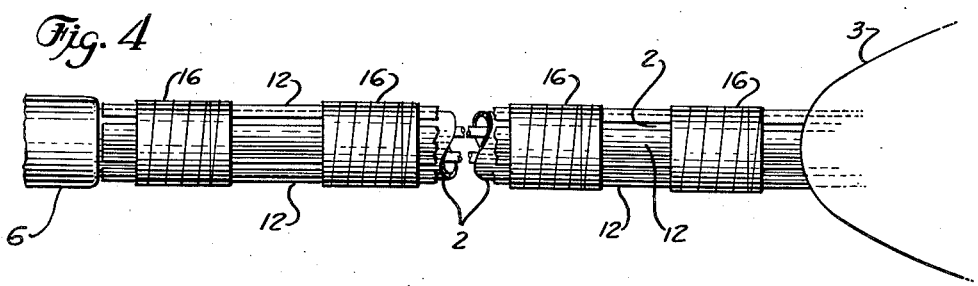
INVENTOR.
ALBERT M. SCHWARTZ
& HARRY M. SONNEBORN
BY
ATTORNEY Patented Jan. 15, 1952

UNITED STATES PATENT OFFICE 2,582,397

VIBRATION DAMPENER

Albert M. Schwartz, Palos Verdes, and Harry M. Sonneborn, Compton, Calif., assignors to Northrop Aircraft, Inc., Hawthorne, Calif., a corporation of California Application November 30, 1948, Serial No. 62,646

5 Claims. (Cl. 188—1)

The present invention relates to vibration dampeners, and more particularly to a vibration dampener ideally suited for use in conjunction with a Pitot tube supporting mast in airplanes.

With the advent of high speed airplanes it has been found that accurate indicated air speed cannot be obtained from Pitot tubes located close to the structure of the airplane. In consequence, Pitot tubes supplying pressures for operation of indicated air speed devices have been placed on the ends of masts 4 to 6 feet long, for example, projecting forwardly of the airplane. In some instances also, two Pitot tubes are utilized, spaced 14 to 16 inches apart, on the forward end of the Pitot tube mast. Obviously, from both weight and drag considerations, the Pitot tube mast size is held to a minimum.

While present Pitot tube masts are amply strong under most normal conditions, it has been found that at certain high speeds, extremely high vibrations are set up in Pitot masts, these vibrations being so severe as to threaten damage to the mast if long continued.

It is an object of the present invention to provide a simple and efficient vibration dampener suitable for use on a rod or mast fastened to a support on one end and subject to vibrations in use.

It is another object of the invention to provide a simple and efficient vibration dampener of low weight and drag for a Pitot tube mast on an airplane.

As applied to a Pitot tube mast, the invention preferably comprises a plurality of strips of metal placed around the periphery of the mast with the strips attached to the mast only adjacent the base thereof and extending forwardly along the outer surface of the mast. Means are then provided to frictionally couple the strips to the mast at specific places along the mast, or over the entire length of the strips. The friction developed between the mast and the strips effectively damps out vibrations imparted to the mast in flight. A similar arrangement is used for any rod or mast fastened at one end to a support and subject to vibration.

The invention will be more clearly understood by reference to the drawings, in which:

Figure 1 is a diagrammatic perspective view of the Northrop B-49 all-wing Air Force jet propelled bomber, showing wing tip installation of a Pitot tube mast embodying the present invention.

Figure 2 is a side view in elevation and partly in section of the basal portion of the Pitot tube mast of Figure 1 showing one embodiment of the present invention, taken as indicated by line 2—2 in Figure 1.

Figure 3 is a cross-sectional view of the mast, taken as indicated by line 3—3 in Figure 2.

Figure 4 is an elevational view of the Pitot tube mast of Figure 1 showing another embodiment of the invention.

Referring first to Figure 1, a high speed airplane 1 of the jet propelled all-wing type is provided with a forwardly projecting Pitot tube mast 2 of circular section attached to the leading edge 3 of the wing adjacent the tip 4 of the wing 5 of the airplane. In this case, the Pitot tube is 6 feet long and 2 inches in diameter, and is provided with a forked end 6, each terminal of the fork carrying a Pitot tube 7. The Pitot tubes 7 are spaced 16 inches laterally and are separately attached to their respective pressure lines 7a and static lines 7b (Figure 3) passing rearwardly through the terminals of the forked end 6, through the mast 2 supported on partitions 7c, to enter the airplane for connection to duplicate air speed indicating means, not shown.

As shown in Figure 2, the Pitot tube mast 2 enters the leading edge 3 of the wing and is attached by bracket 8 to the front wing spar 9, and rearwardly by end bracket 10 to a bulkhead 11 thereby supporting the mast as firmly as possible on the airplane. Pitot tube masts so constructed and supported have, in general, been found satisfactory for relatively low speed airplanes, but at high speeds, such as 400 M. P. H. or greater, such masts will, under certain flight conditions, vibrate to the extent that they may eventually break off in flight due to fatigue of the mast metal.

While such masts could be stiffened and strengthened by ribs, for example, or by increasing the wall thickness or by other methods, such expedients place either a weight penalty, a drag penalty or both on the airplane.

According to the present invention, a vibration dampener is applied to the mast, as shown in Figures 2, 3 and 4.

Basically, one preferred vibration dampener embodying the present invention comprises four longitudinal metal dampening strips 12 diametrically opposed, as shown in Figure 3, each strip being fastened by a bolt 13 to the base of the mast 2 at the level of bracket 8 inside the wing, and extending outwardly to terminate at the beginning of the forked end 6. The strips 12 are preferably curved on a radius slightly smaller than that of the mast, and are then frictionally coupled to the mast at various points along its length, or for the entire length.

In Figure 2, the means shown for creating friction between mast and strips comprises a series of hose clamps 15 spaced about a foot apart along the mast. These hose clamps are adjusted to provide sufficient friction to damp out mast vibrations. The friction value will, of course, vary with the type of airplane and the speed thereof. The main consideration is to provide the maximum frictional force that will still permit relative motion between mast and strips, and which will not be so large as to permit mast and strips to vibrate as a whole. In most instances, the friction applied by the clamps is not critical and the clamps can be tightened to the point where manual movement of the end of the mast moves both strips and mast. The clamps can then be slacked off until movement of the mast causes a sliding friction between mast and strip.

Inasmuch as the strips are, in this case, curved on a radius smaller than that of the rod, the hose clamps, when tightened, tend to distort the strips to the radius of the rod, thus providing a constant friction with a non-resilient clamp. As the hose clamp is reduced in diameter the edges of the strips are first forced against the rod, and as the clamps are tightened these edge areas increase in size. However, the same results can be obtained by the use of strips having the same radius as that of the rod, and the use of a resilient contracting clamp although the resilient strip and solid clamp combination is preferred.

Inasmuch as the frictional forces have not been found to be critical, even the small air drag due to the external protrusions of the hose clamps can, in some cases, be eliminated by taping the strips to the mast, as shown in Figure 4. Here, the strips 12 are held against the mast 2 by tape 16 spirally applied over spaced areas along the mast. This is a preferred mode of applying the tape, although the tape can be, if desired, continuous from the base of the mast to the forked end 6 if desired. Here again, the friction exerted between mast and strips should be made high but not sufficiently high to prevent relative movement between mast and strips. Friction can also be maintained in this case, if desired, by the use of strips having the same radius as that of the rod, and by the use of resilient (such as rubber) tape, to provide a constant pressure between rod and strips.

It is also to be noted that when strips are utilized having a different radius than that of the rod, it is not necessary that the radius of the strips be less than that of the rod. It may be greater. In this latter case, it will be the centers of the strips that first bear against the rod, the areas of contact becoming greater and greater as the diameter of the hose clamps or taped areas is made smaller. In any case, the friction remains as a substantially constant value.

The dampening strips of the present invention extend sufficiently around the tube so that vibration in any plane passing through the axis of the mast will be highly damped, and prevented from being built up to destructive amplitudes. In practice, when used on the Pitot tube mast of the B-49 jet propelled bomber above referred to, the dampener of the present invention, as exemplified by the structure of Figure 4, has proved to be highly satisfactory, fully controlling severe vibrations rendering the original bare mast completely unsatisfactory in high speed flight.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. A vibration damper comprising a rod of substantially circular cross section supported at one end only and subject to lateral vibration, a plurality of strips of cylindrical contour having an original radius of curvature less than that of said rod, and positioned to extend along said rod parallel with the axis thereof with the edges of said strips closely adjacent, said strips being of resilient material and attached adjacent the supported end of said rod only, and a plurality of circular members positioned around the outside of said strips at spaced intervals, the diameter of said members being sufficiently small to increase the original radius of said strips to force the edges of said strips against the outer surface of said rod and maintain friction therewith by virtue of the resiliency of said strips.

2. A vibration damper comprising a rod of substantially circular cross section supported at one end only and subject to lateral vibration, a plurality of strips of cylindrical contour having an original radius of curvature less than that of said rod, and positioned to extend along said rod parallel with the axis thereof with the edges of said strips closely adjacent, said strips being of resilient material and attached adjacent the supported end of said rod only, and means for holding said strips in contact with said rod with a radius of curvature greater than the original radius of curvature of said strips to maintain strip-rod friction by virtue of the tendency of said strips to return to their original radius.

3. A vibration damper comprising a rod of substantially circular cross section supported at one end only and subject to lateral vibration, a plurality of strips of cylindrical contour having an original radius of curvature less than that of said rod, and positioned to extend along said rod parallel with the axis thereof with the edges of said strips closely adjacent, said strips being of resilient material and attached adjacent the supported end of said rod only, and means deforming the contour of said strips to hold inner surfaces of said strips in contact with the external surface of said rod with a radius of curvature approaching that of said external surface whereby by virtue of the resiliency of said strips continuous friction is maintained between said strips and said rod.

4. Apparatus in accordance with claim 1 wherein said circular members are spaced clamps of the hose type, tightened around said strips.

5. Apparatus in accordance with claim 1 wherein said circular members are areas of tape applied around said strips.

ALBERT M. SCHWARTZ.
   HARRY M. SONNEBORN.

REFERENCES CITED

The following references are of record in the file of this patent:

UNITED STATES PATENTS

| Number | Name | Date |
|---|---|---|
| 314,535 | Ketcham | Mar. 24, 1885 |
| 1,638,782 | Paton | Aug. 9, 1927 |
| 1,639,820 | Varney | Aug. 23, 1927 |
| 1,763,064 | Paton et al. | June 10, 1930 |
| 2,228,076 | Flavin | Jan. 7, 1941 |
| 2,465,167 | Little | May 3, 1949 |

FOREIGN PATENTS

| Number | Country | Date |
|---|---|---|
| 146,783 | Switzerland | July 16, 1931 |
| 659,790 | Germany | May 11, 1938 |
| 702,208 | France | Apr. 2, 1931 |